Patented Oct. 7, 1952

2,613,219

UNITED STATES PATENT OFFICE 2,613,219

BORIC ACID ESTERS OF MONO-HYDROXYCYCLOALKANES

Margaret M. Clark, Mountain Lakes, N. J., assignor of one-half to Arthur R. Clark, Mountain Lakes, N. J.

No Drawing. Application October 20, 1949,
Serial No. 122,589

6 Claims. (Cl. 260—462)

This invention relates to boric acid esters of mono-hydroxy-cycloalkanes containing 4 to 10 carbon atoms to the molecule of the alkane and to compositions including the esters for special uses for which the esters are particularly suitable.

The esters of the present invention are useful in cosmetic and medicinal preparations. The invention will be illustrated, therefore, by description in connection with the preparation of the boric acid esters and their use for such purposes.

In the application of cosmetics or medicinals to the skin, the application is sometimes made in the form of a lipophilic and more or less greasy ointment, a hydrophilic or an aqueous ointment, or a powder. The lipophilic type of ointments are adapted to penetrate through any fatty matter or oily film that may be present. The aqueous or hydrophilic composition, once it penetrates into the skin, is more readily absorbed into the aqueous body fluids than is the lipophilic composition. The powder sometimes fails to penetrate adequately although the powder form may be the one ultimately desired on the skin.

My composition, at one stage or another of its use, meets all these requirements. In fact, it goes from the lipophilic to the hydrophilic form and finally to a light powder.

This result I accomplish by means of new esters of boric acid. The partially dehydrated esters to which my invention is directed liberate momentarily either meta ($HBO_2$) or pyroboric acid ($H_2B_4O_7$) on contact with water. Such boric acids, it is considered, immediately combine with additional water to give a more highly hydrated form of the acid such as orthoboric acid ($H_3BO_3$).

The hydrolysis of my esters gives two products. The first is the water-hungry form of boric acid which has been referred to. The second is a volatile hydroxy aromatic compound such as cyclohexanol. This compound, because of its hygroscopicity, also takes up water. The compound and water evaporate, so that there is left ultimately only a powder. This powder is particularly desirable in that it may be brushed off if desired after its function has been served and also because it does not exclude air from the underlying portions of the skin.

Briefly stated the invention comprises a partially, that is, incompletely, dehydrated ester of boric acid with cyclohexanol or a homolog containing 4 to 10 carbon atoms to the molecule. The invention comprises, also, the method of making the boric acid ester which includes heating the mixture of reacting materials until the boric acid disappears into the finished ester and the degree of dehydration corresponding to the meta or pyroborate or a mixture of the two has been reached. The composition of this invention may be used in various commercial compositions suitable for topical application over the skin. Examples of these compositions are mixtures of my esters with excess of the cyclohexanol or the like serving as a solvent or creaming agent or with bentonite, talcum, fine clay, or other inert diluent.

The preferred compound to be esterified with the boric acid is cyclohexanol. This may be written $C_6H_{11}OH$. Other compounds of the same class that may be substituted for cyclohexanol on a mol for mol basis are mono-hydroxycyclobutanol or the corresponding pentanol or heptanol compound. These compounds may have one or more of their hydrogen atoms attached to a carbon atom, but not the hydrogen atom of the hydroxyl group, replaced by a lower alkyl radical such as methyl, ethyl or propyl, so long as the total number of carbon atoms in the molecule does not exceed 10. Examples of compounds that may be used and that have properties illustrating the general properties required are cyclobutanol $C_4H_7OH$, cyclopentanol $C_5H_9OH$, 1-methyl-cyclopentanol-1, 1-methyl-cyclohexanol-1, -2 or -3, 1,3-dimethyl-cyclohexanol-1 or the corresponding ethyl or propyl derivatives with the total number of carbons not exceeding 10. Compounds of this class I call by the name monohydroxycycloalkanes which are understood to be cycloalkanols.

As to proportions of the raw materials, I prefer to use cyclohexanol or the like in proportion somewhat in excess of that which is to be combined with the boric acid. The excess facilitates the removal of water in the preparation to be described. Also a moderate excess in the finished product serves as a temporary softening or plasticizing agent for the otherwise hard ester at the time of application of it to the skin or for other use.

In reacting the cyclohexanol or the like with the boric acid, there is used a temperature which is not above the boiling point of the mixture being esterified. Thus with cyclohexanol, the mixture may be refluxed at about 162° F. or moderately higher as the reaction proceeds. With higher boiling homologs, the temperature may range from 160° to 210° C. Such temperatures give the desired dehydration of boric acid.

If desired, there may be included in the esterification mixture a third component such as toluene, xylene, mesitylene, or other hydrocarbon commonly used to carry out water from esterification reactions. In this particular method, there is employed the usual esterification equipment, with refluxing followed by condensation of the refluxed vapors, separation of the water layer from the condensate, and return of the hydrocarbon layer to the still. When all the water that is to be formed and removed has been carried out by the hydrocarbon, then the hydrocarbon liquid is boiled away.

In the embodiment not using the third liquid, the mixture of the boric acid with the cyclohexanol or the cycloalkanol is refluxed. The vapor which rises is contacted with a water absorbent such as calcium chloride granules. The granules absorb the moisture in the vapor and the unabsorbed cycloalkanol returns to the still for further reaction and carrying to the calcium chloride additional increments of water to be retained.

The esterification reaction is continued until the amount of water removed from the reacting materials corresponds to the formation of the meta or pyroborate ester. At this stage, the boric acid disappears completely into the liquid phase of the reaction. At this stage, it is found also that a specimen of the reaction product, if withdrawn and cooled out of contact with moisture of the air, solidifies to a solid crystalline material.

When the reaction is completed, the whole product is cooled and reduced to comminuted form in conventional grinding or milling equipment. It is necessary during this reduction and at all stages of handling and storage of the ester, that it be kept out of contact with air of more than 40% relative humidity. Otherwise the moisture or water coming into contact with the ester liquefies the surface portion of it by the hydrolysis reaction which has been described above.

The invention will be further illustrated by description in connection with the following specific examples of the practice of it.

*Example 1*

The metaborate of cyclohexanol is made as follows: 1 mol of orthoboric acid $H_3BO_3$ is mixed with 1.67 mols of cyclohexanol. The resulting mixture is refluxed at its boiling point which will be about 162° or somewhat higher as the reaction progresses. Water is removed from the vapors by granules of calcium chloride. The refluxing is continued until the amount of moisture removed corresponds to 1 molecule of water formed in the esterification and also 1 molecule of water formed by dehydration of the original boric acid to the meta or $HBO_2$ stage. Whether the dehydration of the boric acid occurs entirely after or before the formation of the initial ester is not material.

The product formed, after cooling and evaporation of cyclohexanol, had a weight 2.17 times the weight of boric acid used, as compared to approximately 2.05 theory for the metaborate. Some of the excess of cyclohexanol remained in amount to account for this slight excess of actual weight over the theoretical.

The ester is a glossy, slightly yellow crystalline solid that decomposes when heated or when exposed to moisture. In contact with air that has not been dehumidified, the product quickly liquefies.

*Example 2*

The procedure of Example 1 is followed except that the heating is discontinued when the amount of water which is removed from the reaction mass corresponds to $7/4$ mols for each mol of the boric acid used.

The product remaining after cooling in this example is the pyroborate ester of the formula $(C_6H_{11})_2B_4O_7$. It is a slightly yellow, crystalline solid that decomposes at a temperature below its boiling point. It is decomposed quickly by water.

*Example 3*

The procedure above is followed except that any one of the mono-hydroxycycloalkanes listed above is substituted mol for mol for the cyclohexanol in Examples 1 or 2. The product made by the substitution and proceeding otherwise as described is a solid material subject to decomposition in contact with moisture and so reactive with the moisture as to extract it from moisture containing materials with which the ester comes in contact.

*Example 4*

The procedure of Example 2 is followed except that the proportion of the cyclohexanol is made approximately 1 mol for each 4 molecules of boric acid and the heating under reflux is discontinued as soon as all of the boric acid dissolves. In this case the product is the primary pyroborate of the formula $C_6H_{11}HB_4O_7$. It is a solid. It is readily decomposed by water with which the solid reacts.

*Example 5*

The partially dehydrated ester made as described in any one of the examples above is used as a vehicle in cosmetics. The ester is mixed with bentonite as a solid diluent in the proportion of 8 parts of the bentonite to 60 parts of the ester and sufficient cyclohexanol to reduce the whole composition to the consistency of a vanishing cream. The product when rubbed on the skin turns to a powder most of which may be removed by brushing and the rest by simple washing with water.

The esters may be mixed with sulfa drugs or the like for application over the skin. The esters serve as a vehicle for bringing the drugs into contact with the skin, lesions, or imperfections therein.

Either boric acid or cyclohexanol may be added to the esters made as described, to give consistency desired.

It will be understood that it is intended to cover all changes and modifications of the examples of the invention herein chosen for the purpose of illustration which do not constitute departures from the spirit and scope of the invention.

What I claim is:

1. A partially dehydrated ester selected from the group consisting of the metaborate and pyroborate of a mono-hydroxycycloalkane containing 4 to 10 carbon atoms to the molecule of the mono-hydroxycycloalkane.

2. The metaborate of a mono-hydroxycycloalkane of the general formula $(C_nH_{2n-1})BO_2$ in which $n$ is an integral number within the range 4 to 10.

3. The pyroborate of a mono-hydroxycycloalkane of the general formula $(C_nH_{2n-1})_2B_4O_7$ in which $n$ is an integral number within the range 4 to 10.

4. The monopyroborate of a mono-hydroxy-cycloalkane of the general formula $$(C_nH_{2n-1})HB_4O_7$$

in which $n$ is an integral number within the range 4 to 10.

5. The metaborate of cyclohexanol.
6. The pyroborate of cyclohexanol.

MARGARET M. CLARK.

REFERENCES CITED

The following references are of record in the file of this patent:

UNITED STATES PATENTS

| Number | Name | Date |
|---|---|---|
| 1,813,109 | Banks | July 7, 1931 |
| 2,042,952 | Mauersberger | June 2, 1936 |
| 2,053,474 | Graves et al. | Sept. 8, 1936 |

OTHER REFERENCES

Lesser: Drug and Cosmetic Industry, volume 49, October 1941, pages 390 to 393.

Schwartz: Public Health Reports, volume 56, May 16, 1941, pages 1039, 1040, and 1041.

Wuyts et al.: Bull. Soc. Chim. Belg., volume 48, pages 77 to 93 (1939) as abstracted in Chem. Abstracts, columns 7274 to 7275, volume 33 (1939).

Kalish: Drug and Cosmetic Industry, July 1942, volume 51, page 44.